(12) United States Patent
Labarge et al.

(10) Patent No.: US 7,139,762 B2
(45) Date of Patent: Nov. 21, 2006

(54) SYSTEM AND METHOD FOR FILTERING DATABASE RECORDS

(75) Inventors: Matthew R. Labarge, Kirkland, WA (US); Eric D. Bailey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 09/794,564

(22) Filed: Feb. 27, 2001

(65) Prior Publication Data
US 2002/0120604 A1 Aug. 29, 2002

(51) Int. Cl.
G06F 17/00 (2006.01)
G06F 7/00 (2006.01)

(52) U.S. Cl. ........................ 707/100; 707/3; 707/104.1

(58) Field of Classification Search .................. 701/10, 701/3, 5, 102; 707/15
See application file for complete search history.

(56) References Cited

U.S. PATENT DOCUMENTS

| | | | | |
|---|---|---|---|---|
| 4,879,648 A * | 11/1989 | Cochran et al. | ............. | 345/841 |
| 5,063,600 A * | 11/1991 | Norwood | ..................... | 382/186 |
| 5,206,949 A * | 4/1993 | Cochran et al. | ................ | 707/4 |
| RE34,476 E * | 12/1993 | Norwood | ..................... | 382/186 |
| 5,787,411 A * | 7/1998 | Groff et al. | ..................... | 707/2 |
| 5,806,057 A * | 9/1998 | Gormley et al. | ................ | 707/1 |
| 5,924,090 A * | 7/1999 | Krellenstein | .................... | 707/5 |
| 5,999,932 A * | 12/1999 | Paul | ............................ | 707/10 |
| 6,023,723 A * | 2/2000 | McCormick et al. | ....... | 709/206 |
| 6,032,145 A * | 2/2000 | Beall et al. | ..................... | 707/5 |
| 6,041,325 A * | 3/2000 | Shah et al. | .................... | 707/10 |
| 6,073,167 A * | 6/2000 | Poulton et al. | ............. | 709/206 |
| 6,169,992 B1 * | 1/2001 | Beall et al. | ............. | 707/103 R |
| 6,208,985 B1 * | 3/2001 | Krehel | .......................... | 707/3 |
| 6,321,224 B1 * | 11/2001 | Beall et al. | ..................... | 707/5 |
| 6,324,534 B1 * | 11/2001 | Neal et al. | ..................... | 707/3 |
| 6,484,165 B1 * | 11/2002 | Beall et al. | ..................... | 707/3 |
| 6,493,702 B1 * | 12/2002 | Adar et al. | ..................... | 707/3 |
| 6,584,462 B1 * | 6/2003 | Neal et al. | ..................... | 707/3 |
| 6,631,522 B1 * | 10/2003 | Erdelyi | ........................ | 725/53 |
| 2002/0087451 A1 * | 7/2002 | Rieger et al. | ................. | 705/37 |
| 2002/0087573 A1 * | 7/2002 | Reuning et al. | ............ | 707/102 |

(Continued)

OTHER PUBLICATIONS

Borland "Borland Local Interbase Server User's Guide, Version 4.0", pp. 109-110, 1995.*

(Continued)

Primary Examiner—Luke S. Wassum
(74) Attorney, Agent, or Firm—Merchant & Gould

(57) ABSTRACT

A records filter filters database records based on general and/or specific filter criteria. The records filter is effectively utilized in the context of a mail merge process in a document editor, such as a word processor application. The records filter can be provided to a user in the form of a graphical user interface that allows the user to intuitively set and modify filters to process the database records from a database source file. The graphical user interface permits a user to implement general and specific filters to process the records of a database. Specific filters can be designed to exclude specific records from the list of database records. Specific record exclusion can be performed by enabling a user to select or de-select a checkbox associated with each database record. General database record filtration is performed by processing general filter criteria input from the user. The user can input general filter criteria by clicking on a criteria button to expose a criteria list containing all of the unique values in the column. By selecting a value in the criteria list, the user indicates that the record filter's output should include only records containing the selected value in the selected column.

12 Claims, 7 Drawing Sheets

U.S. PATENT DOCUMENTS

2002/0091582 A1* 7/2002 Palmer et al. .................. 705/26
2004/0044661 A1* 3/2004 Allen et al. ..................... 707/3
2004/0056879 A1* 3/2004 Erdelyi ......................... 345/716

OTHER PUBLICATIONS

PR Newswire "MarketLinx and LION to Jointly Market Services", Oct. 21, 1998.*

MarketLinx "Tempo™User's Manual", downloaded from www.sdar.compdf/mlsForms/TempFullManual.pdf, Jan. 11, 2001.*

MarketLinx "Tempo™MLS Quick Reference Guide", downloaded from www.sdar.com/pdf/mlsForms/TempoQuickGuide.pdf, Aug. 2001.*

MetaLogic, Inc. "MetaCat® Collection Management Software", downloaded from metacat2.com/mcwebhelp/contents.html, undated.*

The perfect marriage: integrated word processing and database management programs; Pogrow, S.; *Electronic Learning*, Nov.-Dec., 1983, vol. 3, No.3, pp. 26-32, 110.

SuperWriter; Heck, M.; *Interface Age*, Jun. 1983, vol.8, No.6, pp. 47-49.

Glue together office 2000 apps using VBA; Emigh, S.; *Visual Basic Programmer's Journal*, Apr. 1999, vol. 9, No. 4, pp. 54-55, 57-59, 62.

Electronic automation as an alternative to learning computer tasks; Krull, R.; Dionne, D.; Weise, E.; *Proceedings of IEEE International Processional Communication Conference* (IPCC '93), 1993.

Mail merge as a first programming language; Popyack, J.L.; Herrmann, N.; *SIGCSE Bulletin*, Mar. 1993, vol. 25, No. 1, pp. 136-140.

Criteria for optimum effectiveness of information retrieval systems; Heaps, H.S.; *Information and Control*, Mar. 1971, vol. 18, No. 2, pp. 156-167.

Create a VBA template suite; Kunicki, C.; Maxson, C., *Visual Basic Programmer's Journal*, Feb. 2000, vol. 10, No. 2, pp. 74-76, 78 and 80.

Names and addresses for mail merge; Brown, S.; *C&L Applications*, Jul.-Aug. 1991, vol. 5, No. 1, pp. 6-7.

Word processors: the merge urge (comparison of six packages); Smart, H.; *What Micro*, Jun. 1988, pp. 52-56.

Plan for business; Vaux, J.; *Acorn User*, Aug. 1984, No. 25, pp. 89-93.

* cited by examiner

SYSTEM AND METHOD FOR FILTERING DATABASE RECORDS

FIELD OF THE INVENTION

The present invention generally relates to processing database records. More particularly, the present invention relates to filtering database records based on both general and specific criteria.

BACKGROUND OF THE INVENTION

Database users often filter database records by eliminating unnecessary records before using the records in reports, other documents, or for any other use. For example, a client mailing list database may be filtered to exclude out-of-state clients from a mass mailing. Such a filtered list could be used to send out mailings to only in-state clients to promote a local sale. Similarly, a direct-marketing campaign may be customized to exclude clients that would likely not be interested in a particular product.

Oftentimes, such database filtering is performed in the context of a mail merge. Generally stated, a mail merge is a process of using the records of a database to generate duplicates of a form or template. For example, a database source file, containing records of contact names and the mailing addresses for a list of prospective employers, might be used by a job seeker to generate form letters that could be used as cover letters for a resume. To effect a mail merge, the fields of each record in the database source file are typically associated with corresponding, special fields embedded in the form document. When the mail merge is performed, a reproduction of the form document is generated for each record in the database source file, each reproduction containing the information of a corresponding record. The collection of form document reproductions is referred to as the mail merge output.

Many mail merge users "filter" database records by deleting portions of the mail merge output (for example, within a word processor application) or by printing and discarding the reproduction documents containing the unnecessary database record information. These are very inefficient ways of filtering database records.

More sophisticated prior art database filters have proven to be difficult to use. For example, database management software, such as Structured Query Language (SQL), provide a standardized language for filtering database records. Unfortunately, such software is so complicated that only programmers and expert users can take advantage of its filtering capabilities. Other, less sophisticated database management tools have been integrated into document editor applications, such as word processors, that include mail merge capabilities. However, even these less sophisticated tools have been proven to be difficult for less-sophisticated users to operate effectively and efficiently. As a result, users have continued to resort to deleting or destroying merge documents. Therefore, there is a need in the art for a sophisticated database filter that is effective and efficient and can be readily operated by unsophisticated users.

SUMMARY OF THE INVENTION

The present invention is a records filter for filtering database records based on general and/or specific filter criteria. The records filter of the present invention is effectively utilized in the context of a mail merge process in a document editor, such as a word processor application. Specifically, the records filter is provided to a user in the form of a graphical user interface that allows the user to intuitively set and modify filters to process the database records from a database source file.

In the mail merge context, an exemplary records filter can be implemented as a graphical user interface. The graphical user interface permits a user to implement general and specific filters to process the records of a database. Specific filters are designed to exclude specific records from the list of database records. Specific record exclusion is performed by enabling the selection or de-election of a checkbox associated with each database record. Selecting the checkbox indicates that the record should be included with the list of database records to be used. De-selecting the checkbox indicates that the database record should be excluded from the list of database records. In one aspect of the present invention, the de-selected database records will remain displayed within the record filter's graphical user interface, in case the user later decides to re-select the database record.

General database record filtration is performed by processing general filter criteria input. General filter criteria can be input by clicking on a column header associated with any column (i.e., field name) in the database source file. Each column is associated with a criteria button. A criteria button can be used to expose a criteria list containing all of the unique values in the column. Selecting a value in the criteria list indicates that the record filter's output should include only records containing the selected value in the selected column.

In another aspect of the present invention, the criteria list would also include entries such as "blank entry" and "non-blank entry", to exclude records with or without entries in the selected column. In yet another aspect of the present invention, the criteria list would also include an advanced button that would permit a user to construct multi-term Boolean filters. Once the general and specific criteria have been established, the user can apply the records filter to generate an output list. The database records that have not been excluded from the records list by either the specific or the general criteria, are made available for further records processing.

DETAILED DESCRIPTION OF EXEMPLARY EMBODIMENTS

The present invention is a records filter for filtering database records based on general and/or specific filter criteria. Although the records filter can be used to filter the records of any database in any context, the records filter of the present invention is effectively utilized in the context of a mail merge process in a document editor, such as a word processor application. Specifically, the records filter of the present invention is provided to a user in the form of a graphical user interface that allows the user to intuitively set and modify filters to process the database records from a database source file.

In the mail merge context, an exemplary records filter can be implemented as a dialog box graphical user interface. The graphical user interface permits a user to implement general and specific filters to determine which of the records will be included in a merge output. A user may design specific filters to exclude specific records from the list of database records. Specific record exclusion can be performed by enabling a user to select or de-select a checkbox associated with each database record. By selecting the checkbox, the user indicates that the records should be included with the list of database records to be used. By deselecting the checkbox, the user indicates that the database records should be excluded from the list of database records. In one embodiment of the present invention, the de-selected database records will remain displayed within the Recipients Dialog Box, in case the user later decides to re-select the database record.

General database record filtration is performed by processing general filter criteria input from the user. The user can input general filter criteria by clicking on a column header associated with any column (i.e., field name) in the database source file. Each column is associated with a criteria button. The user may click on the criteria button to expose a criteria list containing all of the unique values in the column. By selecting a value in the criteria list, the user indicates that the record filter's output should include only records containing the selected value in the selected column.

Figure 1:
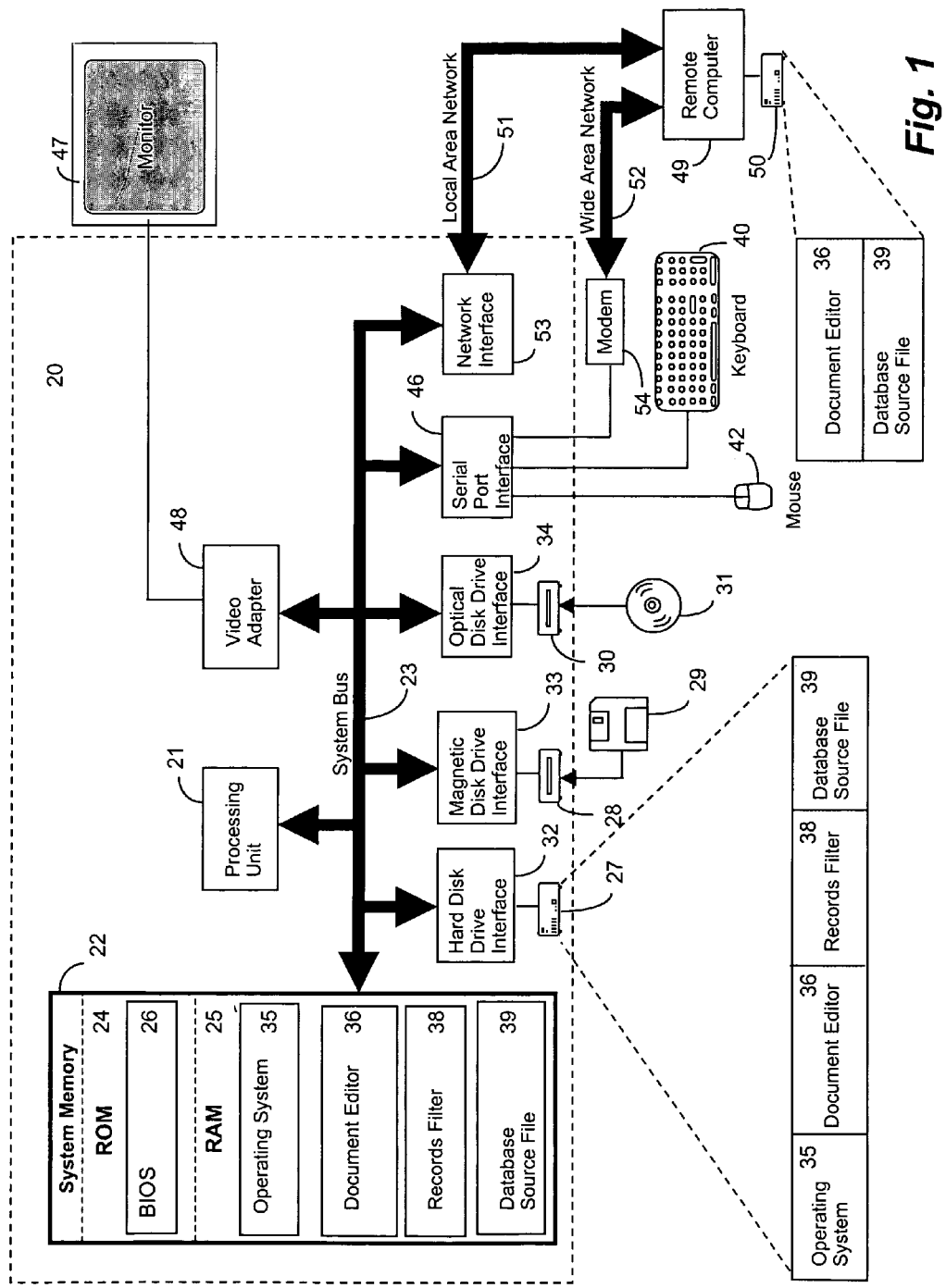
FIG. 1 is a block diagram illustrating an exemplary operating environment for implementing of the present invention.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that helps to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a document editor 36, a records filter 38, and a database source file 39. Program modules include routines, sub-routines, programs, objects, components, data structures, etc., which perform particular tasks or implement particular abstract data types. Aspects of the present invention may be implemented in the form of a record filter program module 38 that can be incorporated into or otherwise in communication with a document editor program module 36. The document editor program module 36 generally comprises computer-executable instructions for creating or modifying an electronic document. The records filter program module 38 generally comprises computer-executable instructions for filtering database records. The database records are typically maintained within the database source file 39, which is generally accessible to the document editor program module 36 and to the records filter program module 38.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
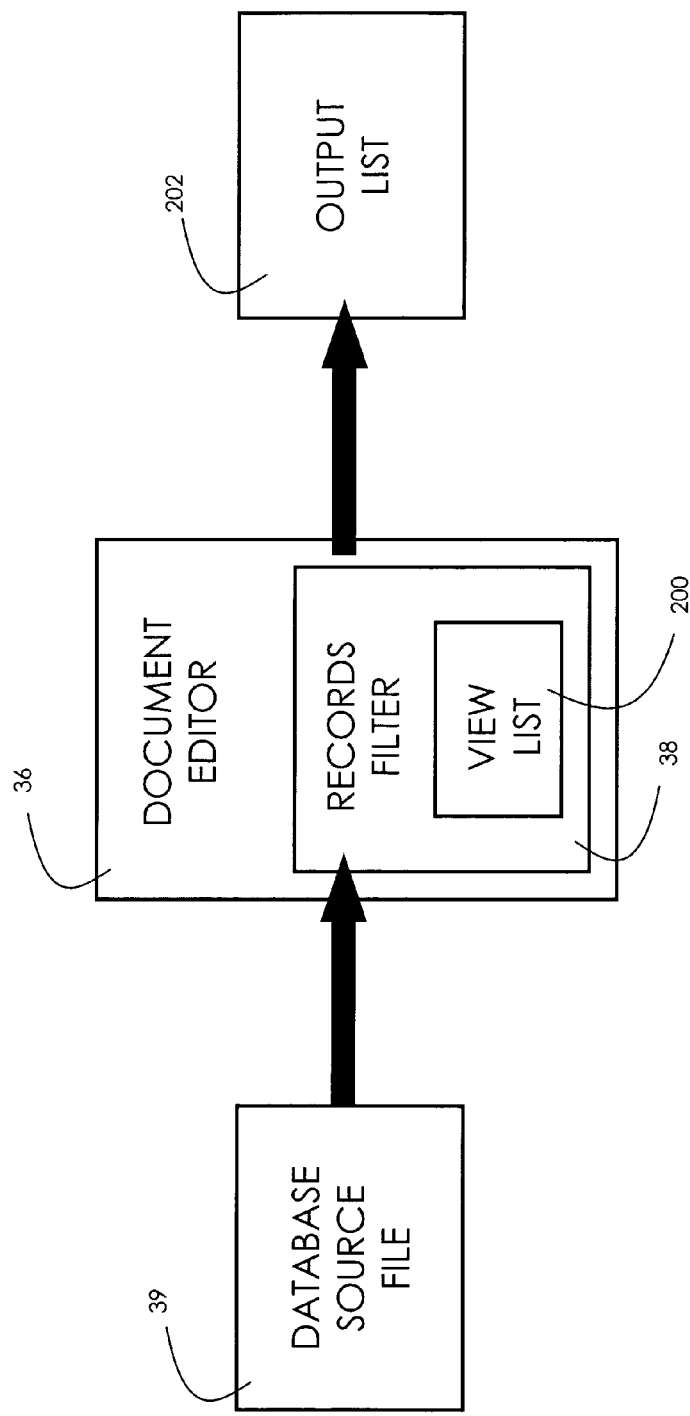
FIG. 2 is a block diagram illustrating some of the primary components of an exemplary embodiment of the present invention, in the context of an exemplary operating environment.

FIG. 2 depicts a records filter 38 which is integrated within a document editor 36. The document editor 36 can be any application program used to create and modify electronic documents of any kind. Word processors, spreadsheet programs, and presentation preparation software are the most common examples of document editors. When a user is using the document editor 36 and wishes to import data from a database, the user will typically first identify a database source file 39. The contents of the database source file 39 (i.e., the records) can be displayed to the user through a view list 200. The view list 200 can be configured to display only the records in the database source file 39 that meet criteria that are set by the user through the records filter 38. In an exemplary embodiment of the present invention, the records filter 38 provides a means for the user of the document editor 36 to enter criteria limiting the records used from the database source file 39. As stated above, the records that are eliminated by the records filter 38 can be excluded from the view list 200. Thus, the user sees only those records from the database source file 39 that meet the criteria that the user has entered via the records filter 38.

Once the user has established all the criteria necessary to exclude records from the view list 200 to the user's satisfaction, the user can process the records to move the filtered records to an output list 202. The output list 202 can be generated in virtually any form. For example, in the case of a word processor user, the records filter 38 could be generated in a format that can be used to implement a mail merge in which contact and address records stored in the database source file 39 can be merged with a form document to create multiple form letters containing the contact and address information from the records. The output list 202, in this case, could include the multiple form letters that are generated through the mail merge process.

The inventors contemplate that a records filter of an exemplary embodiment of the present invention could be used in any application requiring the filtering of database records. The description of the operation of the records filter 38 within the context of a document editor 36 is not intended to limit embodiments of the present invention to such uses.

Figure 3A:
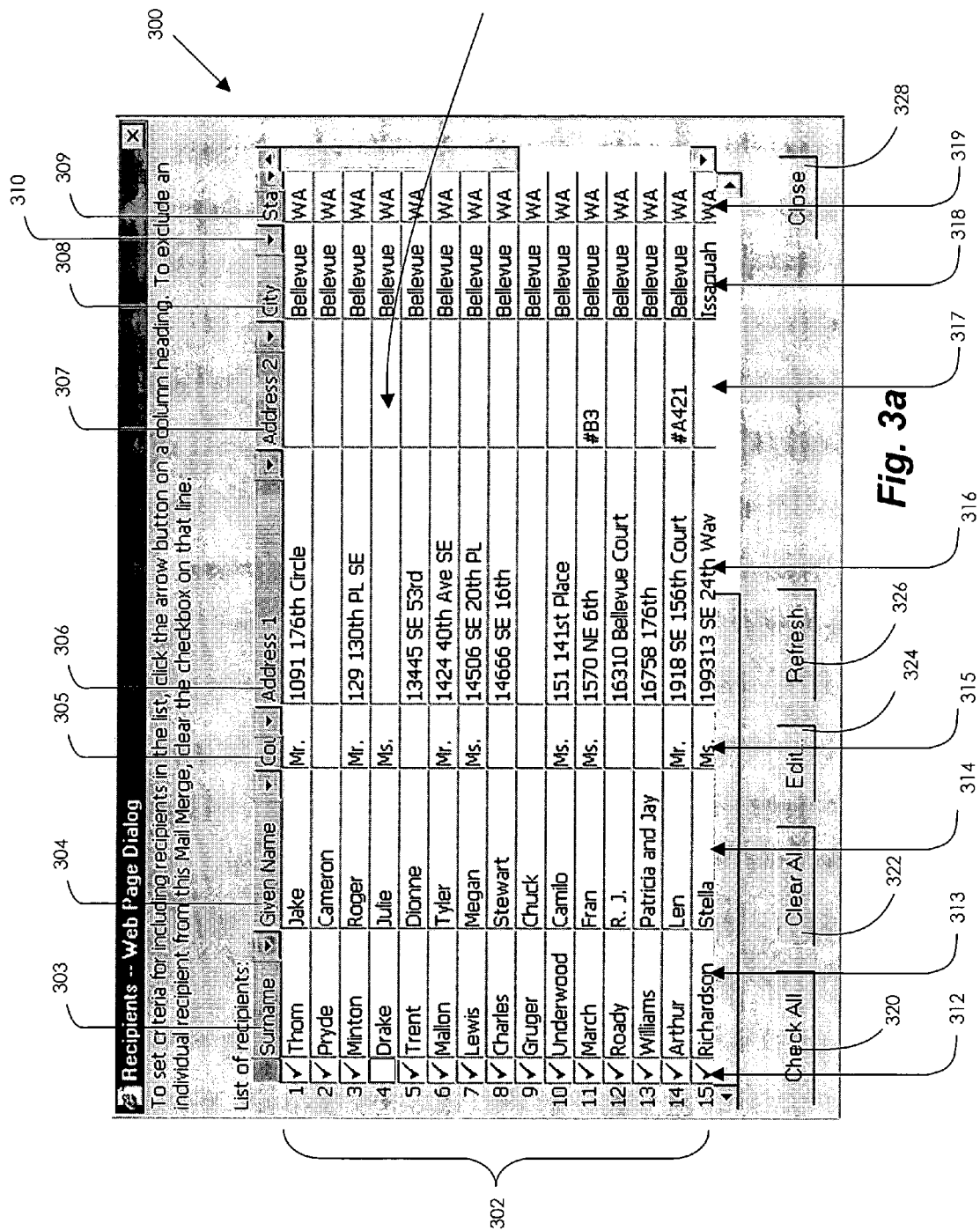
FIG. 3a is a graphical user interface that enables the input of general and specific criteria to a records filter that is an exemplary embodiment of the present invention.

FIG. 3a depicts a user interface of an exemplary embodiment of the present invention. The user interface 300 can be used to set criteria to filter records from a database source file 39. In the example of FIG. 3a, the user interface 300 has a view list 302 including records 1–15. Records 1–15 include the names and addresses of a contact database contained in the database source file 39. Each column 313–319 represents corresponding fields within each record 1–15 contained in the database source file 39. Column 312 contains a box that can be checked or unchecked when the user selects or de-selects the check box associated with each record. The names for each of the columns are displayed in column headers 303–309. Each column header has an associated criteria control button 310. The criteria control button allows the user to select a general criteria for filtering the records contained in the view list 302. The functionality of the criteria control button will be described in more detail in connection with FIG. 3b.

By selecting a check box 312, a user indicates that the specific, corresponding record should be included in the output list 202. By de-selecting the check 11 box 312, the user indicates that the associated record should not be included in the output list 202. Notably, de-selecting the check box 312 associated with a particular record, does not remove the record from the view list 302 in an exemplary embodiment of the present invention.

General criteria can be entered by the user with the criteria control button 310 to remove one or more records from both the view list 302 and from the output list 202. Accordingly, a user can apply specific criteria by using a check box 312 and can apply general criteria by using a criteria control button 310. Generally, specific criteria determines the inclusion or exclusion of a particular record, while general criteria determines the inclusion or exclusion of one or more records.

After a user has made all specific and general criteria entries, the user can process the general and specific criteria by clicking the close button 328. Clicking the close button 328 will trigger the creation of the output list 202. The records that will be moved to the output list are those that satisfy both the general and specific criteria entered by the user by means of the records filter 38.

In an exemplary embodiment of the present invention, the records filter also includes a check all button 320 which will select all check boxes 312 for the records displayed in the view list 302. The records filter 300 can also include a clear all button 322 which will de-select each check box in the view list 302. Selecting and de-selecting check boxes 312 using the check all button 320 or the clear all button 322 has the same effect as individually selecting or de-selecting a record.

In an exemplary embodiment of the present invention, the records filter 300 also includes an edit button 324. The user can edit individual fields of a record by clicking the edit button 324. Editing an individual record may be done through a separate editing interface (not shown). The view list 302 may be refreshed to reflect the edited record. After the user has edited a record, it may be presumed that the user intends that the modified record be included in the output list. Accordingly, the check box 312 for that record may be automatically selected.

In one embodiment of the present invention, the modifications made to the record will be temporary in that the modifications will only affect the record as it is displayed in the view list and transferred to the output list. In an alternative embodiment, the modifications made to the record will be permanent in that the database source file 39 will be modified to reflect the changes the user made to the record, via the records filter 300. In yet another alternative embodiment, the records filter 300 can be modified to allow the user to select whether the changes to one or more records should be temporary or permanent.

The records filter 300 can also include a refresh button 326 which will update the view list 302 in accordance with the general criteria entered by the user. For example, if the user enters general criteria using the criteria control button 310, the view list may or may not be automatically updated to reflect the change. The user can force a view list update by pressing the refresh button 326. As described above, the de-selecting of a check box 312 does not remove a record from the view list. However, in an alternative embodiment, the view list could be configured to eliminate de-selected records. In this alternative embodiment, the refresh button 326 could be used to force the elimination of the de-selected records from the view list 302.

Figure 3B:
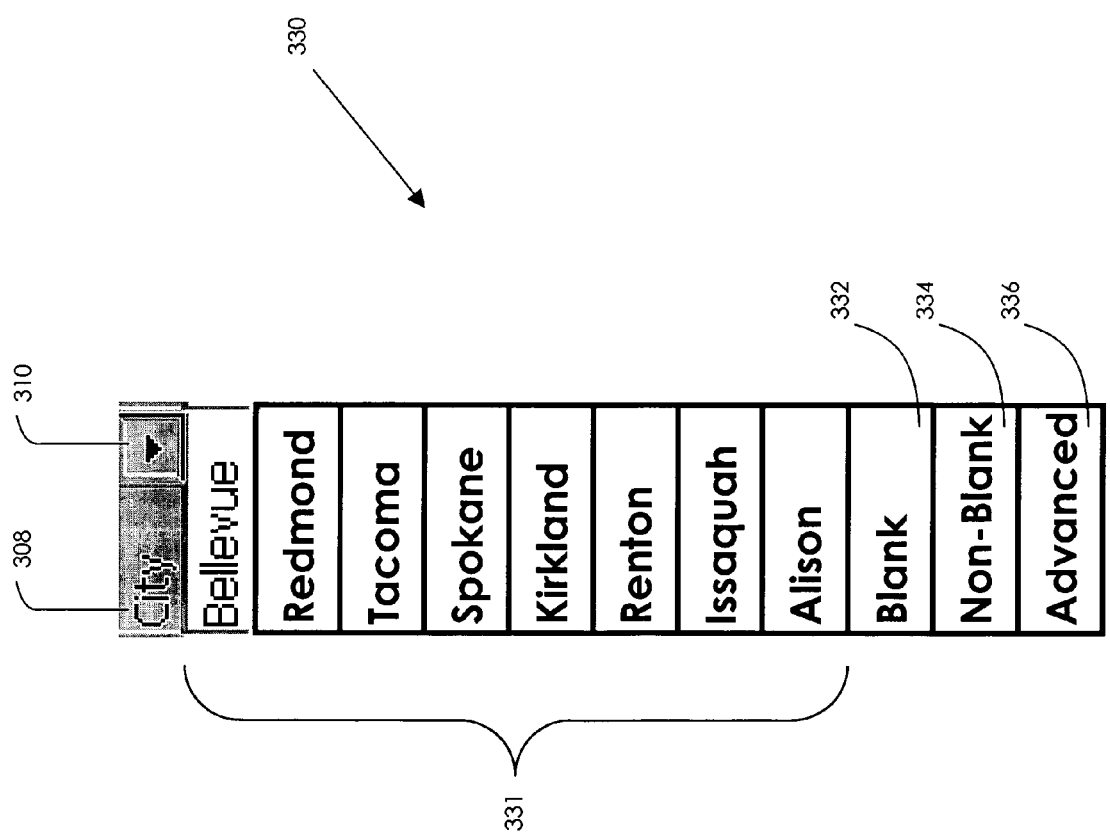
FIG. 3b is a drop-down menu that enables the input of general criteria to a records filter that is an exemplary embodiment of the present invention.

FIG. 3b depicts a drop-down menu that is generated when a user clicks on the criteria control button 310. FIG. 3b illustrates the "City" column of the records depicted in FIG. 3a. When the criteria control button 310 associated with the City column 318 (identified by the "City" column header 308) is pressed, menu 330 is displayed. Menu 330 includes each unique value that appears in the fields of column 318. The unique field menu 330, therefore, provides a list of all unique values within the column 318, so that the user can identify values for entering general search criteria. The unique values are displayed in a unique values portion 331 of the drop down menu 330. In one embodiment of the present invention, the unique values portion 331 of the drop down menu 330 can be suppressed (i.e., not displayed) when the number of unique values in a column exceeds a predetermined threshold number.

By selecting one of the entries in the unique values portion 331, the user enters a general criteria that will eliminate all records from the view list (and ultimately from the output list) that do not include the selected value. For example, record 15 (FIG. 3a) which includes a value "Issaquah" in the City column 318, will be excluded from the view list 302 and from the output list 202 when a user selects the unique value for "Bellevue" by use of the criteria control button 310 and the drop down menu 330. Indeed, all records containing values other than "Bellevue" in the City column 318 will be removed from the view list 302 and from the output list 202.

The drop down menu 330 can also include a "blank" selection 332 and a "non-blank" selection 334. The blank selection excludes all records having an entry in any particular column. That is, any record containing a value that is not blank. The non-blank selection 334 can be used to exclude any record that does not contain an entry in the relevant column. That is, the non-blank selection 334 can be used to eliminate records with blank entries. Those skilled in the art will appreciate that various criteria could be implemented in the drop down menu 330 to eliminate records.

Figure 3C:
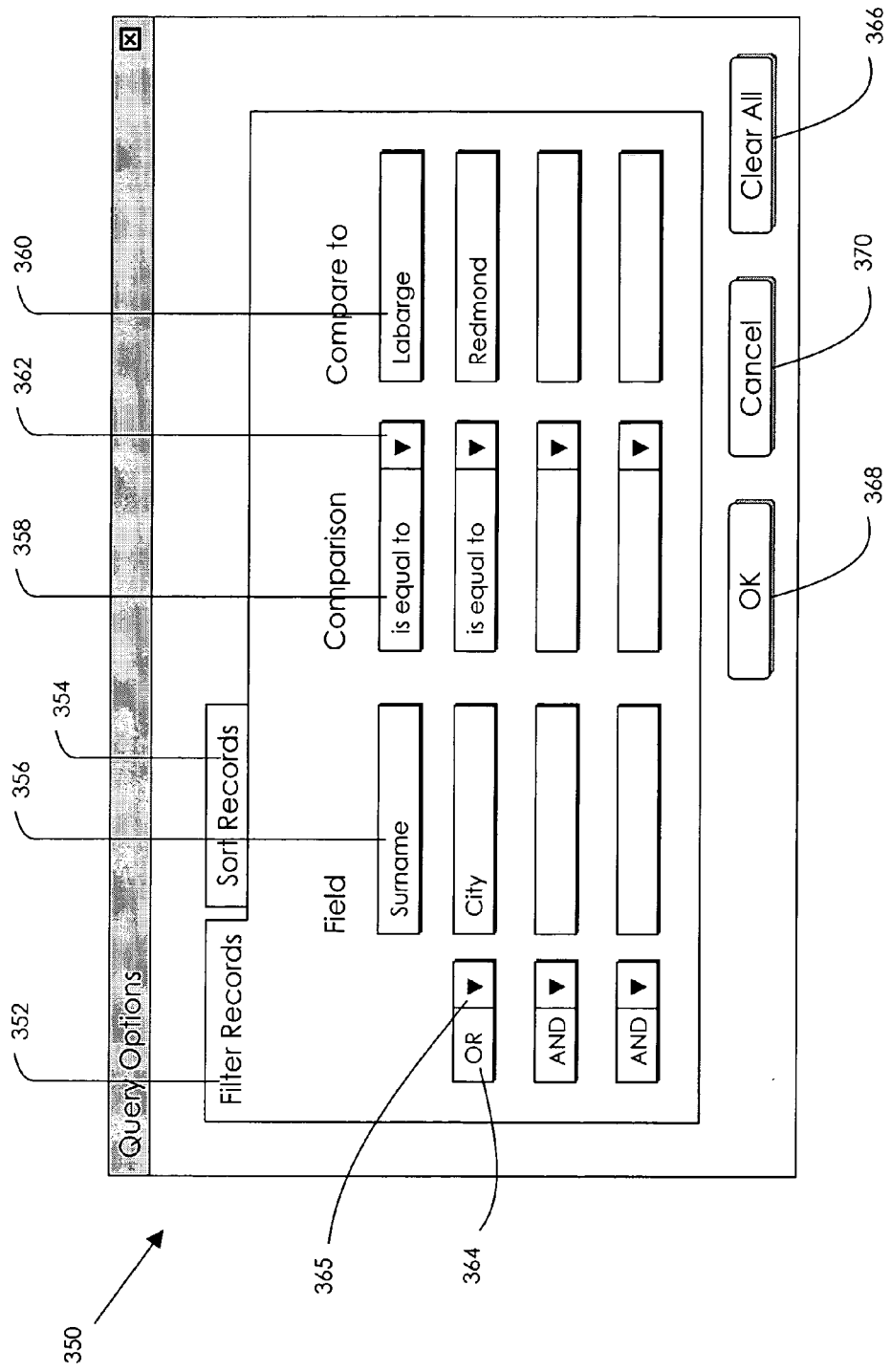
FIG. 3c is a graphical user interface that enables the input of multiple-term general criteria to a records filter that is an exemplary embodiment of the present invention.
Figure 3D:
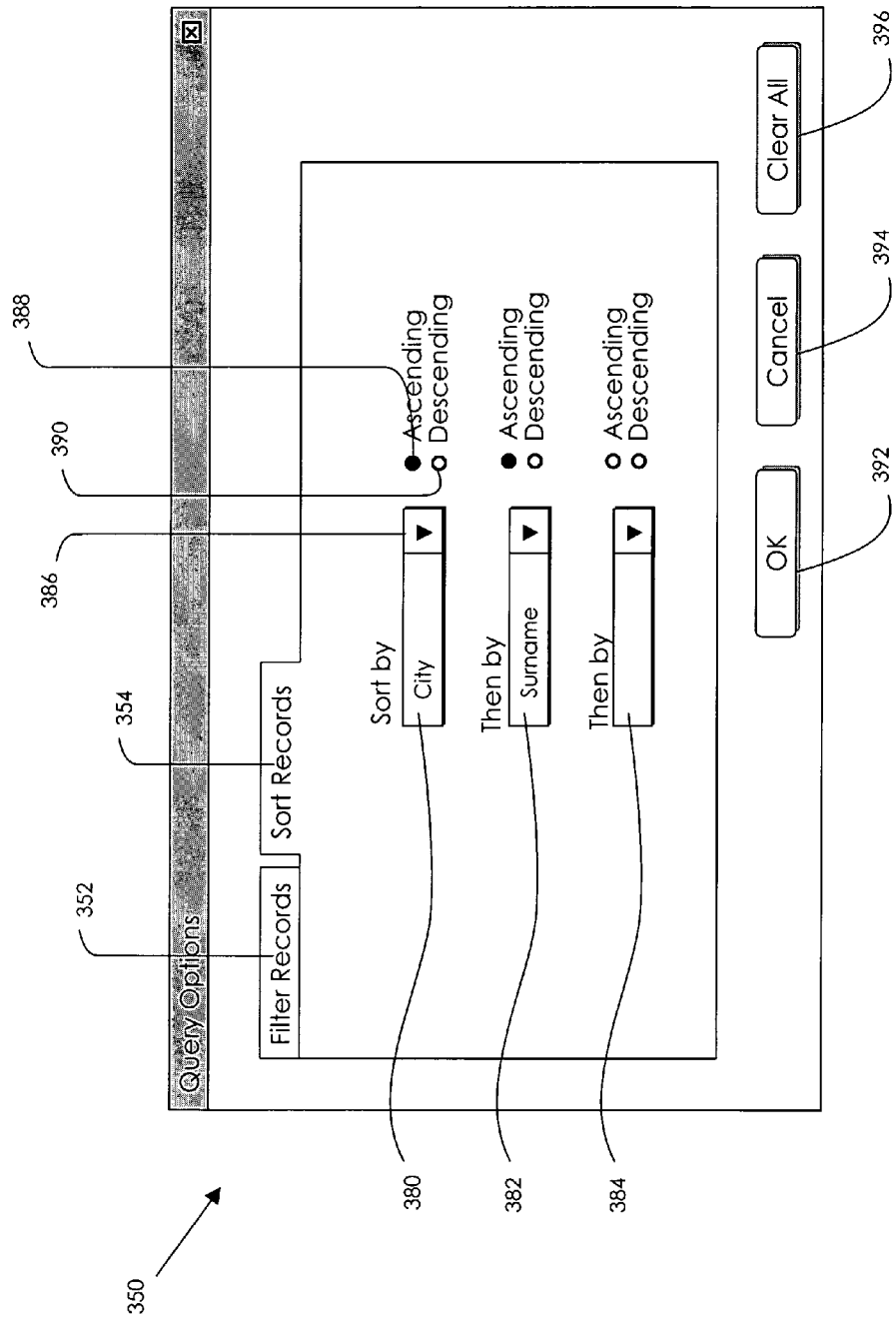
FIG. 3d is a graphical user interface that enables the input of sorting criteria to a records filter that is an exemplary embodiment of the present invention.

The drop down 330 can also include an "advanced" selection 336. The advanced selection permits the entry of multiple-term general criteria. When the advanced selection 336 is chosen, a separate user interface can be used to construct the multiple term general criteria. FIGS. 3c and 3d depict an exemplary user interface for entering multiple-term general criteria.

FIG. 3c depicts a query options user interface (QOUI) 350 that can be used to enter advanced general criteria (i.e., multiple-term filtering and sorting criteria). The QOUI 350 depicted in FIG. 3c is depicted in a filter records mode. The filter records mode is invoked by selecting the filter records tab 352. A sort records mode may be invoked by selecting sort records tab 354. The sort records mode will be discussed in more detail in connection with FIG. 3d.

Filter records mode allows records to be filtered or excluded from the view list 302 and the output list 202. Generally, the entry of general criteria consists of entering a field name in a field name box 356, entering a comparison operator in a comparison operator box 358 and entering a comparison value in comparison value box 360. In the example shown in FIG. 3c, the general criteria entered will exclude all records not having an entry in the Surname column 313 (FIG. 3a) that is equal to the comparison value of "Labarge". The general criteria also may be entered into the field name box 356 by selecting a field name from a list of unique entries provided as a drop-down menu.

Notably, the comparison operation box 358 can be modified by selecting the modification button 362. Typical comparison operators include:
Equal to;
Not equal to;
Less than;
Greater than;
Less than or equal to;
Greater than or equal to;
Is blank;
Is not blank;
Contains; and
Does not contain.

In an alternative embodiment of the present invention, the field name box 356 could be equipped with a modification button to permit the user to select from the field names defined in the data source file 39 (FIG. 1).

The QOUI 350 also includes a Boolean operator box 364. The Boolean operator box 364 permits the entry of a Boolean operator that can be used to string together multiple general criteria terms. In the example depicted in FIG. 3c, the general criteria will exclude records not having a surname of "Labarge" unless the record includes a value of "Redmond" in its City field. Likewise, the general criteria of FIG. 3c will exclude records not having a City value of "Redmond", unless those records have a surname value of "Labarge". The Boolean operator box can also be used to string together multiple general criteria terms that operate on a single column. For example, all records not including the surnames "Labarge" or "Bailey" could be excluded by use of the QOUI 350. Notably, the Boolean operator box 364 can be switched between "OR" and "AND" entries by the use of a toggle button 365. In an alternative embodiment of the present invention, any other Boolean operator could be used in Boolean operator box 364.

When the general criteria have been entered as described above, the general criteria can be applied to the records in the view list by clicking the OK button 368. Alternatively, the general criteria can be cleared from the QOUI 350 by clicking the clear all button 366. Finally, the QOUI 350 can be discarded with no effect on the view list or output list by selecting the cancel button 370.

FIG. 3d depicts the QOUI 350 in sort records mode. As described above, the sort records mode is invoked by selecting the sort records tab 354. When applied to the view list 302 and the output list 202, the sort records criteria will determine the order of the records in the view list 302 and the output list 202. That is, the sort records criteria will determine the order in which the records are displayed in the view list 302 and the order in which the records output to the output 1st 202.

The sort records criteria primarily consists of selecting one or more fields on which to order the records. A first sort records criteria box 380 is depicted in FIG. 3d containing the field name of "City". Additional sort records criteria can be entered in secondary criteria boxes 382, 384, as needed. The field name can be switched by selecting field a name modification button 386 which will provide a list of available field names on which a sort can be based. The order of the sort can be selected by selecting the ascending radio button 388 or the de-sending radio button 390.

When all sort records criteria have been entered, the criteria can be applied to view list 302 and to the output list 202 by selecting the OK button 392. The sort records criteria in QOUI 350 can be cleared by selecting the clear all button 396. Finally, the QOUI 350 can be closed without affecting the output list 202 or view list 302 by selecting the cancel button 394.

Figure 4:
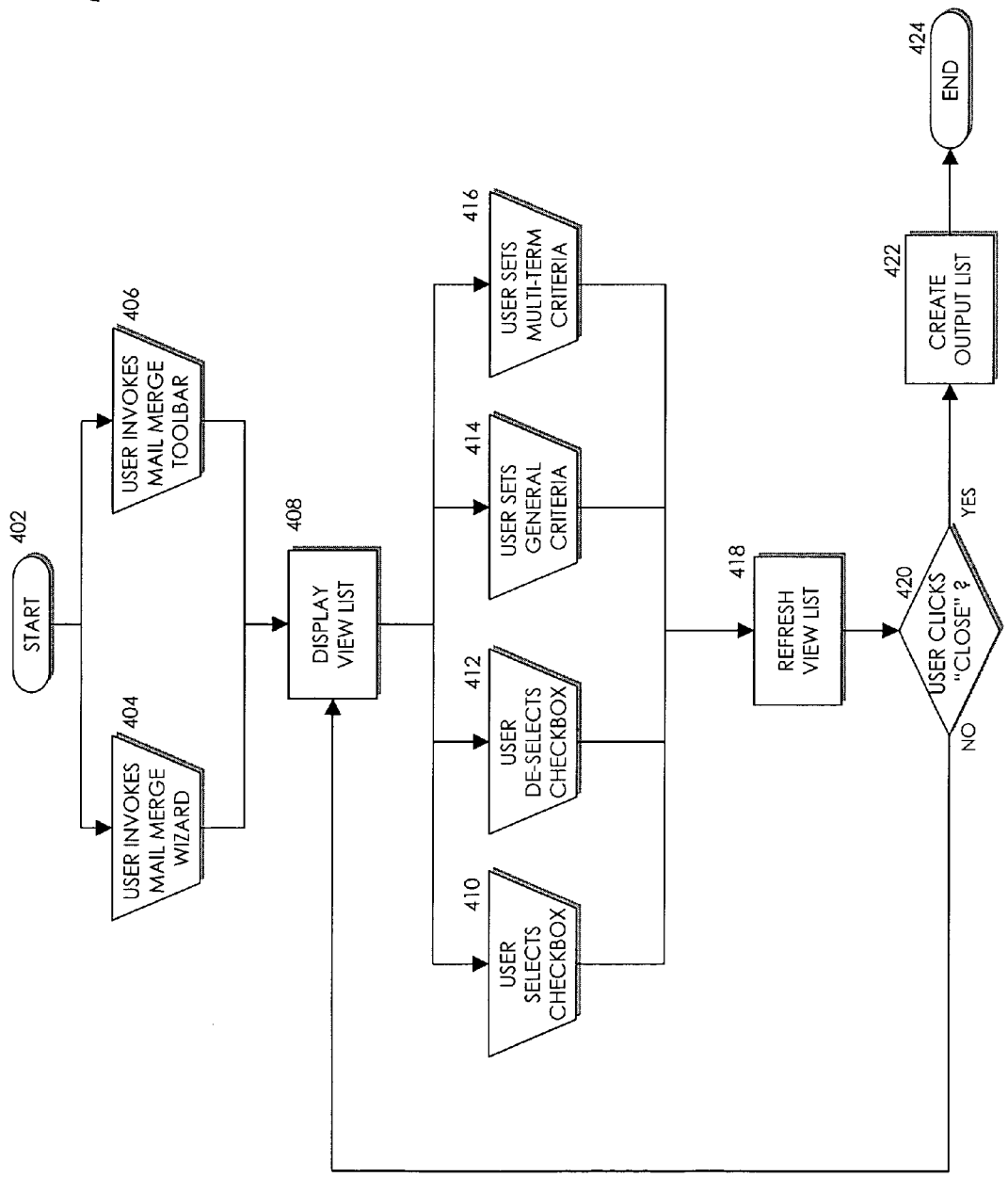
FIG. 4 is a flow chart illustrating an exemplary method for receiving and processing general and specific criteria.

FIGS. 3a–d depict various user interfaces can be used to enter both general and specific filtering criteria for modifying the contents of a view list and/or an output list. While these user interfaces provide a user-friendly means for entering such criteria, the inventors contemplate that various kinds of user interfaces could be used to provide record filtering based on both general and specific criteria. FIG. 4 depicts a method for entering general and specific filtering criteria.

The method of FIG. 4 begins at step 402 and proceeds to event blocks 404 and 406. Event block 404 indicates that the method can be invoked through the use of mail merge wizard. In addition, the method can be invoked through a mail merge toolbar, as indicated by event block 406. In either case, the user has indicated that it wishes to perform a mail merge. In both cases, the method proceeds to step 408. At step 408 the view list is displayed. As described above, the user can enter general and specific criteria to filter the records in the view list and/or output lit. Event blocks 410–416 are available actions that the user can take to enter general and specific filtering criteria.

If the user selects a check box, the method proceeds to event block 410 and then to step 418. If the user de-selects a check box, then the method proceeds to event block 412 and on to step 418. If the user sets general criteria (as discussed in connection with FIGS. 3a–d), the method proceeds to event block 414 and on to step 418. Finally, if the user sets multi-term criteria (as discussed in connection with FIGS. 3c–d), then the method proceeds to event block 416 and then on to step 418. At step 418, the view list is refreshed. That is, the view list is modified (if necessary) to reflect the general and/or specific criteria that have been entered. The method then proceeds to decision block 420.

At decision block 420, a determination is made as to whether the user selects to terminate entry of general and/or specific filtering criteria, by clicking "CLOSE." If the user selects to end criteria entry, then the method proceeds to step 422. At step 422, the output list is created by filtering the records from the database source file 39 as defined by the user's general and/or specific criteria. After the output list has been created, the method proceeds to step 424 and ends.

Returning now to decision block 420, if a determination is made that the user does not wish to end criteria entry, the method branches to step 408. At step 408 the view list is displayed in its refreshed form. And the method proceeds as described above.

Although the present invention has been described in connection with various exemplary embodiments, those of ordinary skill in the art will understand that many modifications can be made thereto within the scope of the claims that follow. For example, it is contemplated that the principles of the invention may be extended to be used in the context of any application requiring a customizable records filter.

Accordingly, it is not intended that the scope of the invention in any way be limited by the above description, but instead be determined entirely by reference to the claims that follow.

What is claimed is:

1. A computer-readable medium containing computer executable instructions, which when executed by a computer, perform a method for eliminating records from a records list, the method comprising the steps of:
    displaying the records list within a single graphical user interface, wherein the records list includes a plurality of records;
    displaying a checkbox associated with each record in the records list;
    displaying a criteria button corresponding to a first field of each record in the records list;
    determining whether the checkbox associated with a first record in the records list has been de-selected;
    removing the first record from the records list in response to a determination that the checkbox associated with the first record has been de-selected;
    receiving a selection of the criteria button;
    in response to receiving the selection of the criteria button, providing a unique values list, wherein the unique values list includes unique values found in the first fields of the records in the records list;
    receiving a selection of a unique value from the unique values list;
    determining whether the first field of a second record in the records list includes the selected unique value;
    if the first field of the second record does not include the selected unique value, then removing the second record from the records list;
    editing a third record of the list of records; and
    in response to editing the third record of the records list, automatically selecting the checkbox associated with the third record to maintain the third record in the records list.

2. The computer-readable medium of claim 1, further comprising if the first field of the second record does include the selected unique value, maintaining the second record in the records list.

3. The computer-readable medium of claim 1, further comprising the step of maintaining the first record in the records list in response to a determination that the checkbox associated with the first record has been selected.

4. The computer-readable medium of claim 1, wherein the unique values list further includes a blank entry selection representing a blank value found in the first field of a fourth record in the records list.

5. The computer-readable medium of claim 1, wherein the unique values list further includes a non-blank entry selection representing a non-blank value found in the first field of a fifth record in the records list.

6. The computer-readable medium of claim 1, wherein the unique valued list further includes a multiple-term criteria selection, the multiple-term criteria selection operative to enable the input of multiple-term general criteria.

7. A computer-readable medium containing computer-executable instructions which when executed by a computer perform a method for eliminating records from a list of records, the method comprising the steps of:
retrieving the list of records from a database source file, wherein each record of the list of records is associated with a checkbox;
displaying the list of records within a single graphical user interface;
after displaying the list of records, receiving a general filter criteria and a specific filter criteria, wherein the general filter is entered by use of a criteria button corresponding to a first field of each record in the list of records, and wherein the specific filter criteria includes a selection of the checkbox associated with at least one of the records from the list of records;
determining whether the checkbox associated with a first record in the list of records is selected;
if the checkbox associated with the first record is not selected eliminating the first record from the list of records;
receiving a selection of the criteria button;
in response to receiving the selection of the criteria button, providing a unique values list, wherein the unique values list includes unique values found in the first fields of the records in the list of records;
receiving a selection of a unique value from the unique values list;
determining whether the first field of a second record in the list of records includes the selected unique value;
if the first field of the second record does not include the selected unique value, then removing the second record from the list of records;
creating an output list, the output list comprising the records remaining after the first record and the second record are eliminated from the list of records;
wherein the specific criteria and the general criteria are received as input to the single graphical user interface;
editing a third record of the list of records; and
in response to editing the third record of the list of records, automatically selecting the checkbox associated with the third record for inclusion of the third record in the output list.

8. The computer-readable medium of claim 7, further comprising if the checkbox associated with the first record is selected, maintaining the first record in the list of records.

9. The computer-readable medium of claim 7, wherein the criteria button is displayed within a portion of the graphical user interface.

10. The computer-readable medium of claim 7, wherein the unique values list further includes a blank entry selection, representing a blank value found in the first field of a fourth record of the list of records.

11. The computer-readable medium of claim 7, wherein the unique values list further includes a non-blank entry selection, representing a non-blank value found in the first field of a fifth record of the list of records.

12. The computer-readable medium of claim 7, wherein the unique values list further includes a multiple-term criteria selection, the multiple-term criteria selection operative to enable the input of multiple-term general criteria.

* * * * *